INVENTOR.
CAMILLO GUERRINI
BY
ATTORNEY

United States Patent Office 3,454,141
Patented July 8, 1969

3,454,141
RETAINER FOR BRAKE LINKAGE MEMBERS
Camillo Guerrini, R.D. 2, Greenville, Pa. 16125
Filed Apr. 26, 1967, Ser. No. 633,792
Int. Cl. F16d 65/14; B61h 13/00
U.S. Cl. 188—210                                    1 Claim

ABSTRACT OF THE DISCLOSURE

Disclosed in the following specification and drawing is a retainer for preventing loose brake beam connecting bars or rods from dropping to the roadbed. A bracket is secured to the tension member of the brake beam and provides mounting holes for a generally U-shaped member which passes below the connecting bar and, in the event the bar becomes loose, supports the bar. The U-shaped member is secured to the brackets so as to minimize the effect on the truck assembly of the impact of the falling bar on the U-shaped support. The mounting bracket is provided with different mounting faces to permit the bracket to be secured to tension members of either circular or rectangular cross-section.

---

This invention relates to railway freight car trucks and more particularly to a device for retaining the connecting bars which operate the brake beams of the truck in the event these bars become loose.

On many freight cars, especially those subject to heavy and/or high speed use, it is common practice to equip the trucks with brake beams fore and aft of each axle so that the wheels of the truck are each clampingly engaged by two brake shoes when the brakes are applied. These brake beams are actuated by means of brake cylinders mounted either on the car body underframe or on the trucks and connected to the brake beams by a toggle linkage which has connecting bars extending under the axles. Occasionally, due either to failure of a part of the linkage or to improper securing of a connecting pin, one end of the connecting bar becomes detached and falls to the ground. Such a dangling bar is likely to at least damage the ties and turnout elements and possibly cause derailment.

It is the primary object of my invention to provide means, in the event an end of a connecting bar becomes loose, to retain the connecting bar in a position such that it does not strike any portion of the roadbed or track structure and thus prevent the danger of damage and derailment. A further object of the invention is to provide such a retaining device which in no way interferes with the normal operation of the brake system. Another object of the invention is the provision of a connecting bar retaining device which is characterized by its simplicity and which may be readily installed on existing equipment without necessitating modification thereof.

For a complete understanding of the objects and advantages of my invention reference should be had to the following specification and the appended drawing wherein is described and shown a preferred embodiment of the invention.

Figure 1:
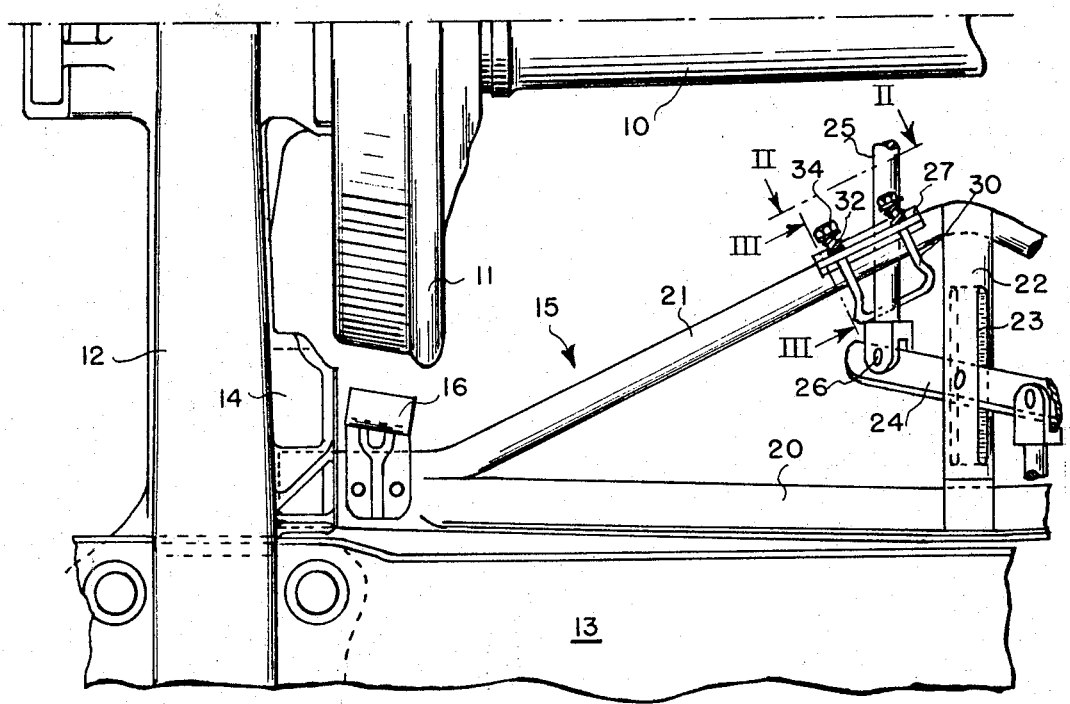
FIGURE 1 is a fragmentary plan view of a freight car truck having a pair of brake beams associated with each axle and equipped with the retainer device of my invention.

Trucks used with freight car rolling stock are commonly provided with a pair of axles 10 mounting track-engaging wheels 11 and journaled in sideframes 12. The sideframes 12 are connected to one another by a bolster 13 on which the car body rests. Adjacent to the bolster 13, extending parallel to the axles 10, and slideably carried by sockets 14 in sideframes 12 are brake beams 15 which are equipped with brake shoes 16 closely adjacent the tread portion of the wheels 11. On heavy duty trucks additional brake beams are provided on the opposite sides of the axles 10 from the brake beams 15. These brake beams are also slideably carried by sockets in the sideframes. This arrangement permits braking force to be applied to larger areas of the tread portions of the wheels 11 and, therefore, substantially increases the total braking force. The brake beams 15 are composed of a compression member 20 and a bow or flattened V-shaped tension member 21 joined at its ends to the end portions of the compression member 20. A strut 22 joins the midpoints of the compression member 20 and the tension member 21 and this strut is provided with a slot 23 through which passes a lever 24. The lever 24 is connected to the brake rigging carried on the car body and to a lever pivotally mounted on the strut of another brake beam by a linkage arrangement which causes the levers to force the brake beams toward the axles bringing the brake shoes into contact with the tread portions of the wheels 11. The details of this linkage are well known to those skilled in the art and as they are not of importance in this specification, no attempt has been made to show or describe this linkage fully. However, it should be noted that connecting rods 25 of this linkage pass from lever 24 to the lever associated with the outer brake beam below the axle 10. This rod is pivotally connected to the lever 24 by a pin 26.

In the event one of the pins 26 becomes loose or the rod 25 or one of the levers 24 breaks, the free end of rod 25 falls to the ground. The dragging end of rod 25 is likely to extensively damage the roadbed and track structure, especially at turnouts and crossings. Dragging rods are also a major cause of derailments both by becoming fouled with the wheels and by damaging the track. My invention provides a simple, economical means for retaining the free end of any such rod in a position well clear of all trackwork thus eliminating the damage and danger of derailment caused by such dragging rods.

Secured to the tension member 21 by welding, for example, is a bracket 27 having an upwardly projecting rib 28 in which are provided holes 29. A substantially U-shaped rod 30, the end portions 31 of which are bent to an obtuse angle with respect to the major portion of the rod, has its end portions extending through the holes 29 in rib 28. Springs 32 are fitted over the end portions 31 and the assembly is secured by means of washers 33 and shakeproof nuts 34. The portions of rod 30 below the end portions 31 are bent outwardly as shown at 35 providing a large opening 36 through which the brake lever connecting rod 25 passes.

During normal operation of the brakes, the rod 25 moves freely within the opening 36 without contacting the retaining rod 30 or bracket 27. If the end of rod 25 becomes free, however, it drops to the lower portion of opening 36 and strikes rod 30, the impact being absorbed by the springs 32. The U-shaped rod 30 holds the end of connecting rod 25 well above the trackwork.

Figures 2, 3, 4:
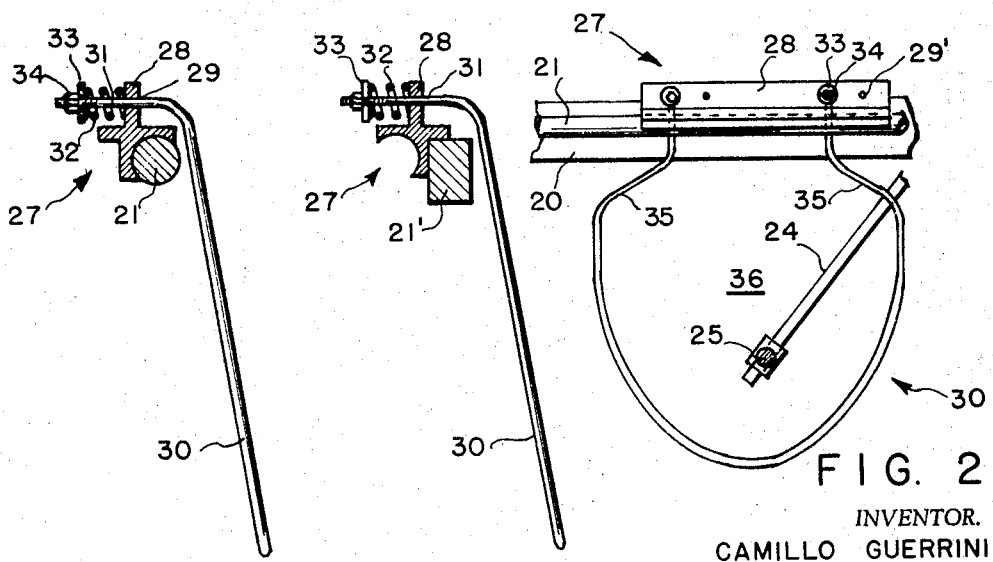
FIGURE 2 is an end elevational view of the retainer device of my invention.
FIGURE 3 is a transverse sectional view taken along the line III—III of FIGURE 1.
FIGURE 4 is a view similar to that of FIGURE 3 but showing the retainer device of my invention installed on a freight car truck equipped with brake beams of a different construction.

The bracket 27 is provided with two mounting positions, the first (as shown in FIGURE 3) being used on brake beams whose tension members are circular in cross-section and the second (as shown in FIGURE 4) being used on brake beams having tension members of rectangular cross-section. This arrangement eliminates the necessity of manufacturing and stocking a variety of brackets and insures that the bracket is securely fastened to the tension member of the brake beam. The bracket 27 may also be provided with additional holes 29' in the rib 28 to permit the position of the retaining rod 30 to be adjusted with repositioning the bracket 27 and to permit the use of different sizes of retaining rods if desired.

While the invention has been described with special reference to heavy duty trucks having four brake beams, it will be readily apparent that the retainer of my invention may be advantageously used in any situation where it is desired to prevent broken brake rigging depending from a brake beam or the like from dropping to the ground. Likewise, it will be readily apparent that changes and additions may be made in and to the embodiment described above without departing from the spirit of my invention.

Having described my invention what I claim is:

1. On a railway car truck having a pair of axles journaled in sideframes and mounting track-engaging wheels, a bolster joining said sideframes, brake beams each having a compression member and a V-shaped tension member the mid-point of which is spaced from and connected to the mid-point of said compression member by means of a strut, the end portions of said brake beams being slideably received in said sideframes, brake shoes mounted on said brake beams, and means to force said brake shoes against said wheels comprising a linkage of levers and rods actuated by a brake cylinder, the improvement comprising: a substantially U-shaped rod surrounding one of said linage rods; a bracket having a pair of mounting surfaces parallel to one another, one of said surfaces being complementary in cross-section to tension members of circular cross-section and the other of said surfaces being complementary to tension members of rectangular cross-section, said bracket having an upwardly projecting rib provided with holes to receive the ends of said U-shaped rod; and means to retain said U-shaped rod in said holes; the arrangement being such that said linkage rod passes freely through the opening defined by said U-shaped rod and said mounting means under normal operating conditions and is supported by said U-shaped rod when broken or detached.

References Cited

UNITED STATES PATENTS 2,077,547   4/1937   Busse _____ 188—210
2,788,860   4/1957   Spaeth et al. _____ 188—210

DUANE A. REGER, *Primary Examiner.*

U.S. Cl. X.R.

188—52